United States Patent
Greminger et al.

(10) Patent No.: US 10,643,655 B2
(45) Date of Patent: May 5, 2020

(54) BASEPLATE RESONANT AXIS OPTIMIZATION

(71) Applicant: Seagate Technology LLC, Cupertino, CA (US)

(72) Inventors: Michael Allen Greminger, St. Anthony, MN (US); Bradley Jay Ver Meer, Savage, MN (US); Markus Erwin Mangold, Minneapolis, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 739 days.

(21) Appl. No.: 14/559,092

(22) Filed: Dec. 3, 2014

(65) Prior Publication Data

US 2015/0085400 A1   Mar. 26, 2015

Related U.S. Application Data

(62) Division of application No. 12/570,777, filed on Sep. 30, 2009, now Pat. No. 8,929,032.

(51) Int. Cl.
    *G11B 17/32*      (2006.01)
    *G11B 5/48*       (2006.01)

(52) U.S. Cl.
    CPC ............ *G11B 17/32* (2013.01); *G11B 5/4833* (2013.01); *Y10T 29/49032* (2015.01)

(58) Field of Classification Search
    CPC ................ G11B 17/32; G11B 17/4833; Y10T 29/49032; Y10T 29/49027; Y10T 29/49025; Y10T 29/49021; Y10T 29/49002

USPC ............ 360/294, 244.8, 244.5, 244.9, 245.7; 29/603.03, 603.04, 603.05, 603.7
    See application file for complete search history.

(56) References Cited

U.S. PATENT DOCUMENTS

| | | |
|---|---|---|
| 5,065,268 A | 11/1991 | Hagen |
| 5,367,420 A | 11/1994 | Yagi et al. |
| 5,561,570 A | 10/1996 | Gill et al. |
| 5,862,015 A | 1/1999 | Evans et al. |

(Continued)

FOREIGN PATENT DOCUMENTS

| | | |
|---|---|---|
| JP | 2002-184140 A | 6/2002 |
| JP | 2002-279745 A | 9/2002 |

(Continued)

*Primary Examiner* — Peter Dungba Vo
*Assistant Examiner* — Azm A Parvez
(74) *Attorney, Agent, or Firm* — Holzer Patel Drennan

(57) ABSTRACT

In one implementation, the presently disclosed technology teaches an apparatus with a head attached to an end of a baseplate. The baseplate includes a tilted section that causes a torsion axis of the baseplate to pass near the head. In another implementation, the presently disclosed technology teaches an apparatus with a load beam attached to a baseplate. The apparatus also includes a head attached to an opposite end of the load beam from the baseplate. The baseplate includes a mass-shifted section that causes a torsion axis of the apparatus to pass through the head. In yet another implementation, the presently disclosed technology teaches a method for reducing baseplate resonance amplitude. The method includes shifting a baseplate mass on a suspension toward an adjacent disc surface to move a baseplate torsion axis to pass near a head.

18 Claims, 8 Drawing Sheets

(56) References Cited

U.S. PATENT DOCUMENTS

| | | | |
|---|---|---|---|
| 5,867,347 A | 2/1999 | Knight et al. | |
| 5,896,246 A | 4/1999 | Budde et al. | |
| 5,986,451 A | 11/1999 | Kagan | |
| 6,023,574 A | 2/2000 | Tangren | |
| 6,061,205 A | 5/2000 | Finegan | |
| 6,063,508 A | 5/2000 | Hanrahan et al. | |
| 6,633,458 B2 | 10/2003 | Wu et al. | |
| 6,735,055 B1 | 5/2004 | Crane et al. | |
| 6,765,761 B2 * | 7/2004 | Arya | G11B 5/4813 360/244.5 |
| 6,778,362 B1 * | 8/2004 | Davis | G11B 5/4833 360/244.5 |
| 6,856,487 B1 | 2/2005 | Mei et al. | |
| 7,006,333 B1 | 2/2006 | Summers | |
| 7,068,469 B2 | 6/2006 | Kuwajima et al. | |
| 7,113,370 B2 | 9/2006 | Limmer et al. | |
| 7,293,348 B2 * | 11/2007 | Erpelding | G11B 5/4833 29/603.03 |
| 7,408,743 B1 | 8/2008 | McCaslin et al. | |
| 7,570,458 B1 | 8/2009 | Coon | |
| 7,573,680 B1 | 8/2009 | Kulangara | |
| 7,898,770 B1 | 3/2011 | Zhang et al. | |
| 7,952,835 B2 | 5/2011 | Lee et al. | |
| 8,203,807 B2 | 6/2012 | Takasugi et al. | |
| 8,390,957 B2 | 3/2013 | Takikawa et al. | |
| 8,675,314 B1 * | 3/2014 | Bjorstrom | G11B 5/483 360/294.3 |
| 2001/0043443 A1 * | 11/2001 | Okamoto | G11B 21/025 360/294 |
| 2002/0051317 A1 | 5/2002 | Takagi et al. | |
| 2004/0090710 A1 | 5/2004 | Honda et al. | |
| 2004/0231139 A1 | 11/2004 | Jurgenson | |
| 2005/0128645 A1 | 6/2005 | Limmer et al. | |
| 2005/0152068 A1 | 7/2005 | Erpelding | |
| 2006/0203391 A1 | 9/2006 | Motonishi | |
| 2008/0192383 A1 * | 8/2008 | Takasugi | G11B 5/4833 360/244.2 |
| 2009/0086379 A1 * | 4/2009 | Hanya | G11B 5/4833 360/294.4 |
| 2009/0147406 A1 | 6/2009 | Otake et al. | |
| 2012/0002328 A1 | 1/2012 | Aoki et al. | |
| 2013/0077193 A1 | 3/2013 | Fujimoto | |

FOREIGN PATENT DOCUMENTS

| | | |
|---|---|---|
| JP | 2003-223771 A | 8/2003 |
| JP | 2003-281843 A | 10/2003 |
| JP | 2009-187662 A | 8/2009 |

* cited by examiner

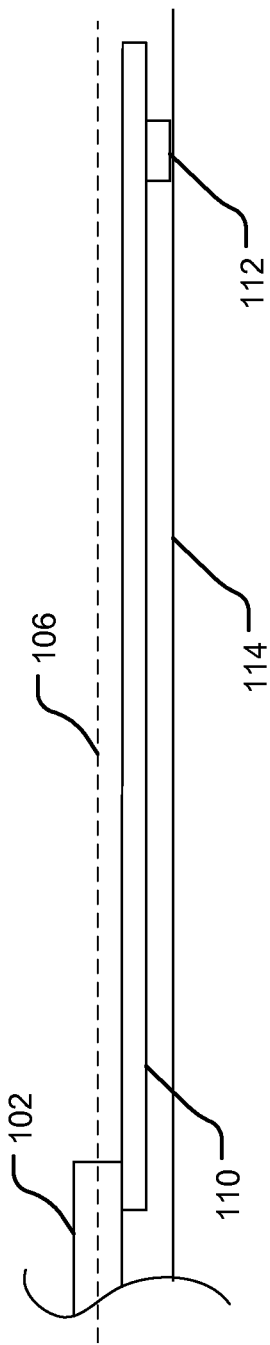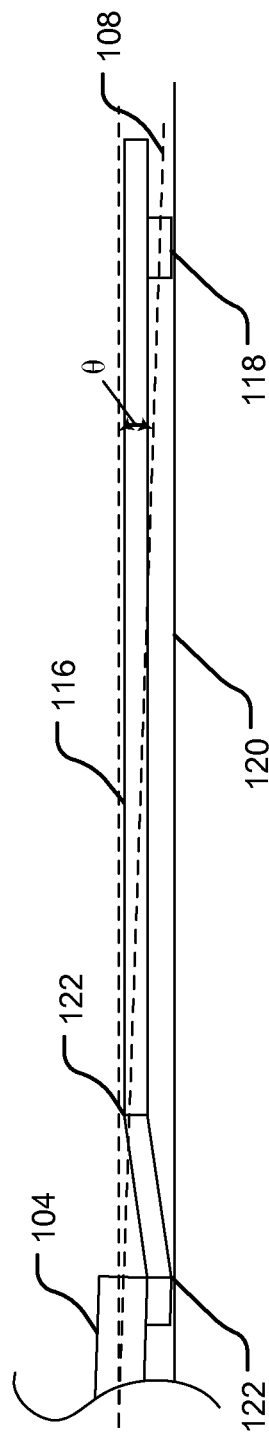
FIG. 1A
FIG. 1B

BASEPLATE RESONANT AXIS OPTIMIZATION

CROSS-REFERENCE TO RELATED APPLICATIONS

The present application is a divisional of U.S. application Ser. No. 12/570,777 entitled "Baseplate Resonant Axis Optimization" and filed on Sep. 30, 2009, which is specifically incorporated by references for all that it discloses or teaches.

BACKGROUND

Magnetic disc drives typically include a head mounted on a head suspension that places the head over a desired track of a magnetic disc for reading and/or writing data onto the magnetic disc. There is a continual desire with such magnetic disc drives to decrease size, increase storage density, and reduce costs. To decrease size and increase storage density, tracks on the disc at which the data is stored are positioned closer and closer together. Higher track densities make positioning of the head more important for accurate reading and writing of data. As track density increases, it becomes increasingly difficult for a voice coil motor and servo control system that controls the head suspension to quickly and accurately center the head over a desired track on the magnetic disc.

As precise positioning of the head becomes more critical, it also becomes more difficult to accurately position the head with a single actuation source. Accordingly, microactuators have been proposed to further position the head relative to the magnetic disc. The microactuator provides fine position control, while the voice coil motor provides macro position control of the head as it traverses the surface of the magnetic disc. Better designs for actuation and suspension systems are needed.

SUMMARY

In one implementation, the presently disclosed technology teaches an apparatus with a head attached to an end of a baseplate. The baseplate includes a tilted section that causes a torsion axis of the baseplate to pass near the head.

In another implementation, the presently disclosed technology teaches an apparatus with a load beam attached to a baseplate. The apparatus also includes a head attached to an opposite end of the load beam from the baseplate. The baseplate includes a mass-shifted section that causes a torsion axis of the apparatus to pass through the head.

In yet another implementation, the presently disclosed technology teaches a method for reducing baseplate resonance amplitude. The method includes shifting a baseplate mass on a suspension toward an adjacent disc surface to move a baseplate torsion axis to pass near a head.

Other implementations are also described and recited herein.

BRIEF DESCRIPTION OF THE DRAWINGS

FIG. 1A is an elevation view of an example level baseplate with a corresponding torsion axis.

FIG. 1B is an elevation view of an example tilted baseplate with a corresponding torsion axis.

DETAILED DESCRIPTIONS

Figure 2:
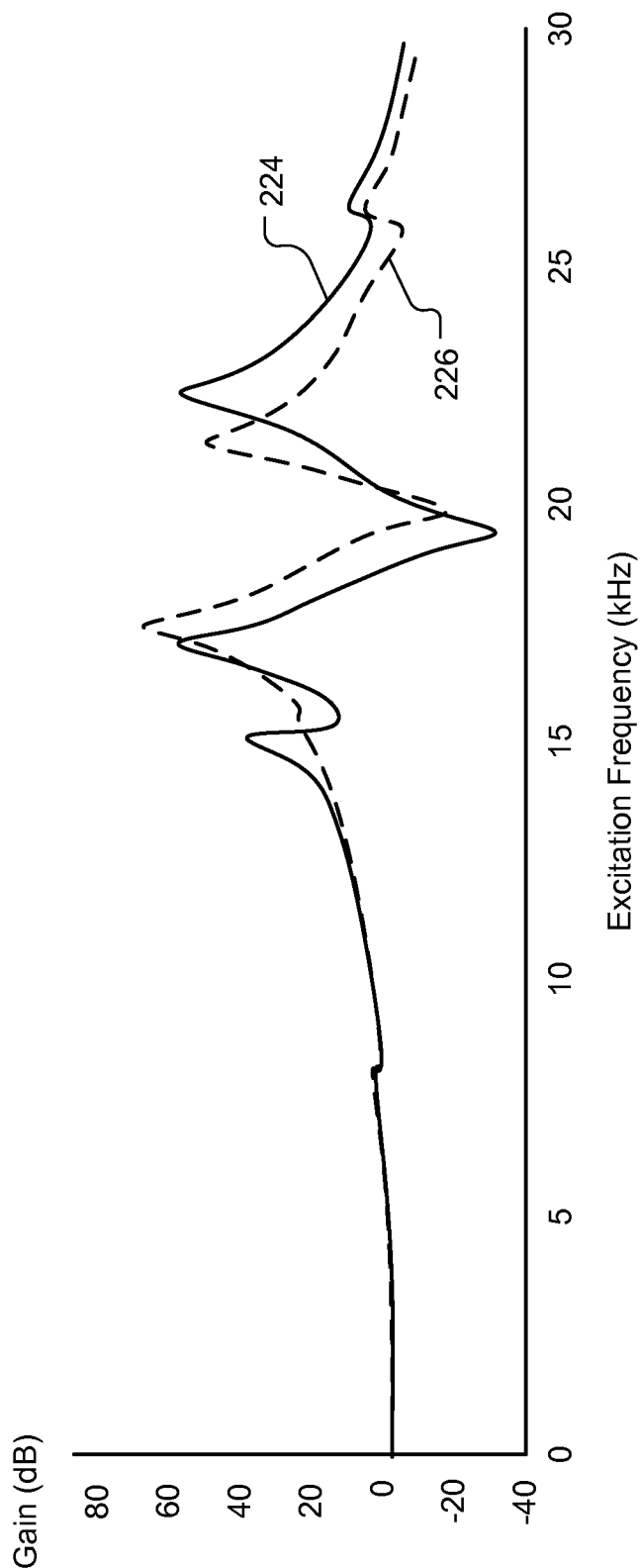
FIG. 2 illustrates a frequency response function A corresponding to a flat baseplate and a frequency response function B corresponding to a tilted baseplate.

A baseplate in a head suspension that has sufficient flexibility to allow piezoelectric elements (or other microactuator motor elements) on the baseplate to deform the baseplate for fine position control may introduce unwanted resonance modes. One of these unwanted resonance modes is referred to herein as a baseplate torsion mode. The baseplate torsion mode causes torsion about an axis running generally longitudinally along the head suspension. The exact location of the torsion axis is primarily defined by a distribution of weight in the baseplate. For example, the torsion axis may run from a position where the baseplate attaches to an actuator arm and along a mass centerline of the baseplate. In conventional microactuator suspension designs, the drive level servo control algorithm compensates for the baseplate torsion mode in order to achieve adequate tracking performance. However, this compensation decreases the overall bandwidth of the tracking system.

FIG. 1A is an elevation view of an example level baseplate 102 with a corresponding torsion axis 106. Conventional microactuator suspension designs typically utilize the level baseplate 102 or alternatively a tilted baseplate not optimized to pass the torsion axis 106 near or through a respective head 112. The level baseplate 102, a load beam 110, and the head 112 are collectively part of a suspension for a disc drive. The head 112 "flies" a distance above a disc surface 114 while the disc is spinning. Further, the head 112 follows a desired track on the disc as the disc spins.

The example level baseplate 102 has a torsion axis 106 running generally horizontally through the level baseplate 102. One end of the load beam 110 is mounted to an end of the level baseplate 102 and the head 112 is mounted to an opposite end of the load beam 110. Since the torsion axis 106 does not intersect with the head 112, torsion about torsion axis 106 may result in significant lateral displacement (i.e., displacement parallel to the disc surface 114 and orthogonal to the longitudinal axis of the suspension) of the head 112. While the baseplate torsion axis 106 is illustrated as substantially level in FIG. 1A, the baseplate torsion axis 106 may angle upwards or downwards depending on the weight distribution of the level baseplate 102. Regardless, significant lateral displacement may occur when the baseplate torsion axis 106 does not pass near or through the head 112.

FIG. 1B is an elevation view of an example tilted baseplate 104 with a corresponding torsion axis 108. In some implementations, microactuator suspension designs according to the presently disclosed technology utilize the tilted baseplate 104 and/or a baseplate otherwise optimized to pass a torsion axis near or through a respective head 118. The tilted baseplate 104, a load beam 116, and the head 118 are similarly part of another suspension for a disc drive. The head 118 also "flies" a distance above a disc surface 120 while the disc is spinning and the head 118 also follows a desired track on the disc as the disc spins.

The tilted baseplate 104 has a distribution of mass that is closer to the disc surface 120 than the level baseplate 102. This is referred to herein as shifting the mass of the baseplate 104 toward the disc surface 102. As a result, a baseplate torsion axis 108 corresponding to the tilted baseplate 104 is similarly closer to the disc surface 120 and may also be angled downward toward the disc surface 120 at 0 degrees. The exact angle and position of the baseplate torsion axis 108 depends on the weight distribution of the tilted baseplate 104. The weight distribution of the tilted baseplate 104 is optimized such that the torsion axis 108 passes through the head 118 rather than above the head 118 as in FIG. 1A. Example baseplate designs optimized to pass the torsion axis 108 near or through the head 118 are discussed in detail with regard to FIGS. 3-6B.

While torsion about the torsion axis 108 may still cause rotation of the baseplate 104 and the load beam 116 about the baseplate torsion axis 108, lateral displacement of the head 118 is significantly reduced or eliminated. Additionally, an end of the tilted baseplate 104 that attaches to the load beam 116 is angled toward the disc surface 120 and/or oriented closer to the disc surface 120 than the level baseplate 102. As a result, the load beam 116 may have one or more deflections 122 to restore the load beam 116 to a desired orientation and height above the disc surface 120. In one implementation, the mass of the tilted baseplate 104 is significantly greater than the mass of the load beam 116 and/or head 118. As a result, deflections 122 do not substantially affect the position of the torsion axis 108.

In one implementation, only a portion of the tilted baseplate 104 is tilted. For example, the titled baseplate 104 may have a deflection line across its width with one side of the deflection line level and the other side of the deflection line tilted (see e.g., FIGS. 3-4B). In another implementation, the entire tilted baseplate 104 is tilted. For example, the tilted baseplate 104 may be attached to a tilted surface on an actuator arm. One advantage to utilizing a tilted surface on the actuator arm is that the remainder of the drive suspension may remain unchanged. In yet another implementation, all or part of the actuator arm may be tilted and thus the tilted baseplate 104 is similarly tilted (see e.g., FIG. 7). One limitation of tilting the actuator arm is that in multi-disc drives the amount of clearance for tilting the actuator arm is limited.

FIG. 2 illustrates a frequency response function A 224 corresponding to a flat baseplate and a frequency response function B 226 corresponding to a tilted baseplate. Frequency response functions A 224 and B 226 represent off-track motion of a head caused by resonance applied to a baseplate. Frequency response function A 224 tracks off-track motion of a head when the corresponding baseplate is flat or otherwise not optimized to pass a baseplate torsion axis near or through the head. Frequency response function B 226 tracks off-track motion of a head when the corresponding baseplate is tilted or otherwise optimized to pass the baseplate torsion axis near or through the head. Example tilted or otherwise optimized baseplates may be found in FIGS. 3-6B.

Frequency response A 224 illustrates three significant distinct resonant modes at approximately 15 kHz, 17 kHz, and 22 kHz. The resonant mode at approximately 15 kHz corresponds to a base plate torsion mode. More specifically, base plate torsion mode is a lower-order torsion of the head about an axis running generally longitudinally along the drive suspension.

Frequency response B 226 illustrates only two significant resonant modes at approximately 17 kHz and 21 kHz. Generally, lower frequency resonant modes have more impact on head performance than higher frequency resonant modes. As a result, the lower-order baseplate torsion at 15 kHz is addressed by shifting a mass distribution of the baseplate to pass a baseplate torsion axis near or through the head.

The resonant mode at 17 kHz of frequency response B 226 generally corresponds to the resonant mode at 17 KHz of frequency response A. Similarly, the resonant mode at 21 KHz of frequency response B generally corresponds to the resonant mode at 22 kHz of frequency response A. The resonant mode at 15 kHz of frequency response A 224 is largely absent from resonant mode B 226 because the base plate torsion axis of the tilted baseplate passes near or through the head. As a result, there is little to no off-track motion of the head. In this example implementation, the baseplate was tilted 2 degrees; however, the requisite tilt angle to shift the torsion axis to pass near or through the head may vary.

Figure 3:
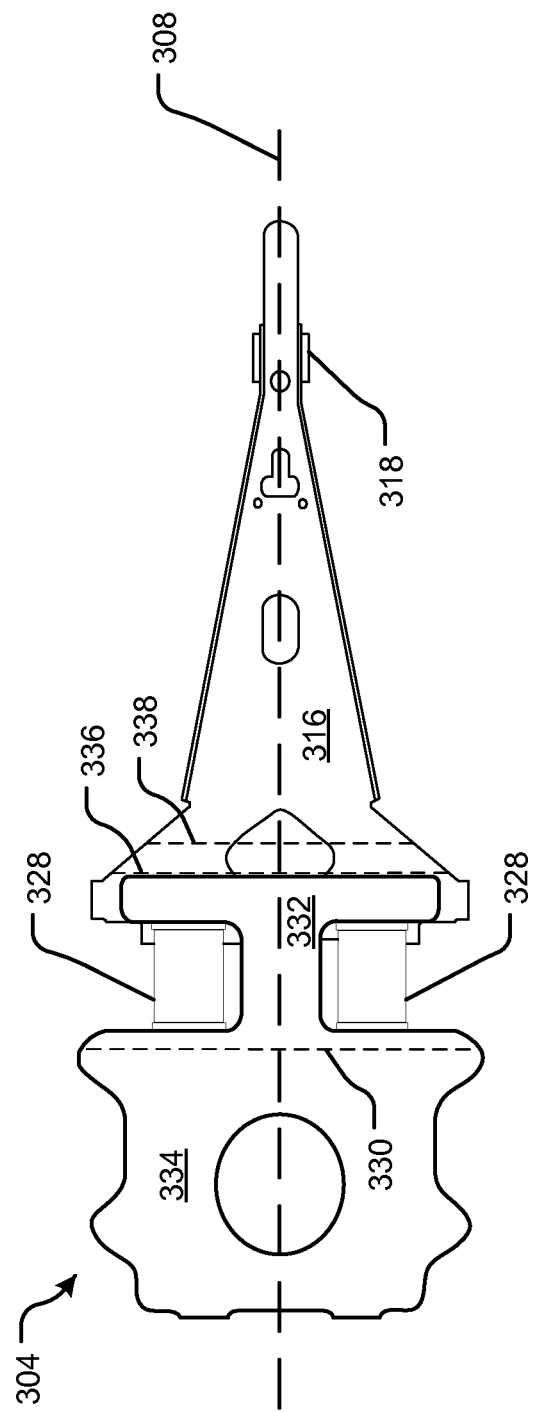
FIG. 3 is a plan view of an example tilted baseplate attached to a load beam and a head.

FIG. 3 is a plan view an example tilted baseplate 304 attached to a load beam 316 and a head 318. In some implementations, the tilted baseplate 304 is generally multi-planar (i.e., it includes elements that lie on two or more planes) with a deflection line 330 delineating the two or more planes. A main section 334 of the tilted baseplate 304 is mounted approximately parallel with a disc surface. A T-shaped section 332 of the tilted baseplate 304 is angled downward toward the disc surface (see e.g., baseplate 104 in FIG. 1B). The T-shaped section 332 may have one or more piezoelectric elements 328 (e.g., one or more piezoelectric dies) mounted on either side of a center portion of the T-shaped section 332. The piezoelectric elements 328 expand and contract with an applied electric field and control fine adjustment of the T-shaped section 332 with reference to the main section 334 of the tilted baseplate 304. Macro position control of the head is accomplished by rotating the entire tilted baseplate 304 about an axis running generally perpendicular to the disc surface using a voice coil motor and servo control system.

One end of the load beam 316 is attached to a bottom side of the T-shaped section 332 of the baseplate 304. The load beam 316 moves with the macro position control of the baseplate 304 and fine adjustment of the T-shaped section 332. The head 318 is mounted on the underside and at the opposite end of the load beam 316. Since the T-shaped section 332 of the baseplate 304 is tilted toward the disc surface, the load beam 316 has a first deflection line 336 that deflects the load beam 316 away from the disc surface and a second deflection line 338 (e.g., a preload bend) that orients the load beam at a desired height and orientation above the disc surface. A torsion axis 308 passes along a plan view centerline of the baseplate 304, load beam 316, and head 318. The torsion axis 308 also angles downward toward the disc surface in an elevation view (see e.g., FIG. 4B) to pass near or through the head 318.

Figure 4A:
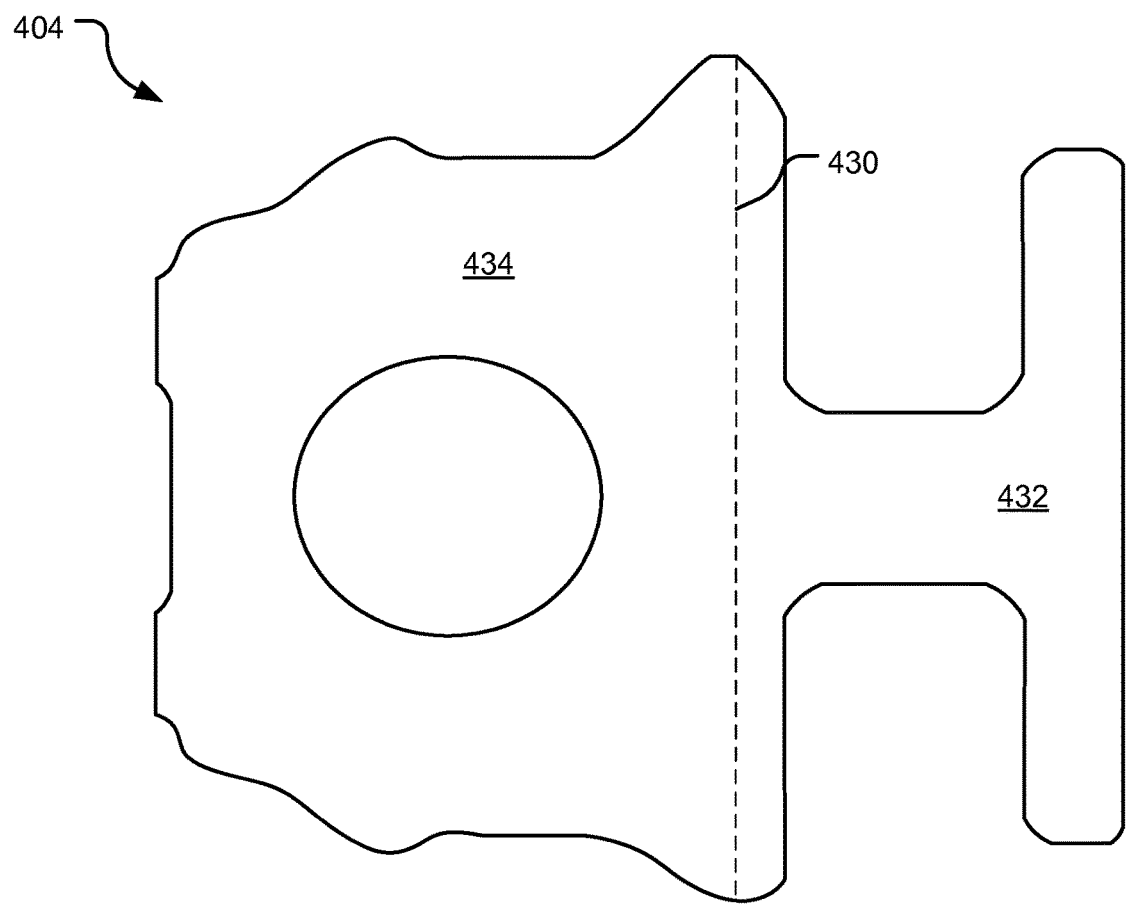
FIG. 4A is a plan view of an example tilted baseplate.

FIG. 4A is a plan view of an example tilted baseplate 404. The tilted baseplate 404 has a main section 434 and a T-shaped section 432 joined by a deflection line 430. The main section 434 is configured to attach to an actuator arm and is oriented generally parallel to a disc surface. The T-shaped portion 432 is configured to attach to a load beam and is tilted toward the disc surface. The tilted T-shaped portion 432 moves a center of mass of the tilted baseplate 404 toward the disc surface 420.

Figure 4B:
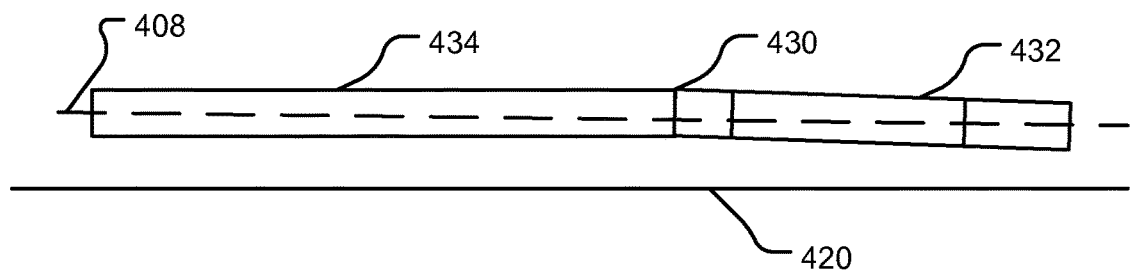
FIG. 4B is an elevation view of the example tilted baseplate of FIG. 4A.

FIG. 4B is an elevation view of the example tilted baseplate 404 of FIG. 4A. The tilted baseplate 404 has a main section 434 and a T-shaped section 432 joined by a deflection line 430. A torsion axis 408 is coincident with a center of mass of the tilted baseplate 404. Therefore, by deflecting the T-shaped section 432 downward toward the disc surface 420, the torsion axis 408 is similarly deflected downward toward the disc surface 420.

Figure 5A:
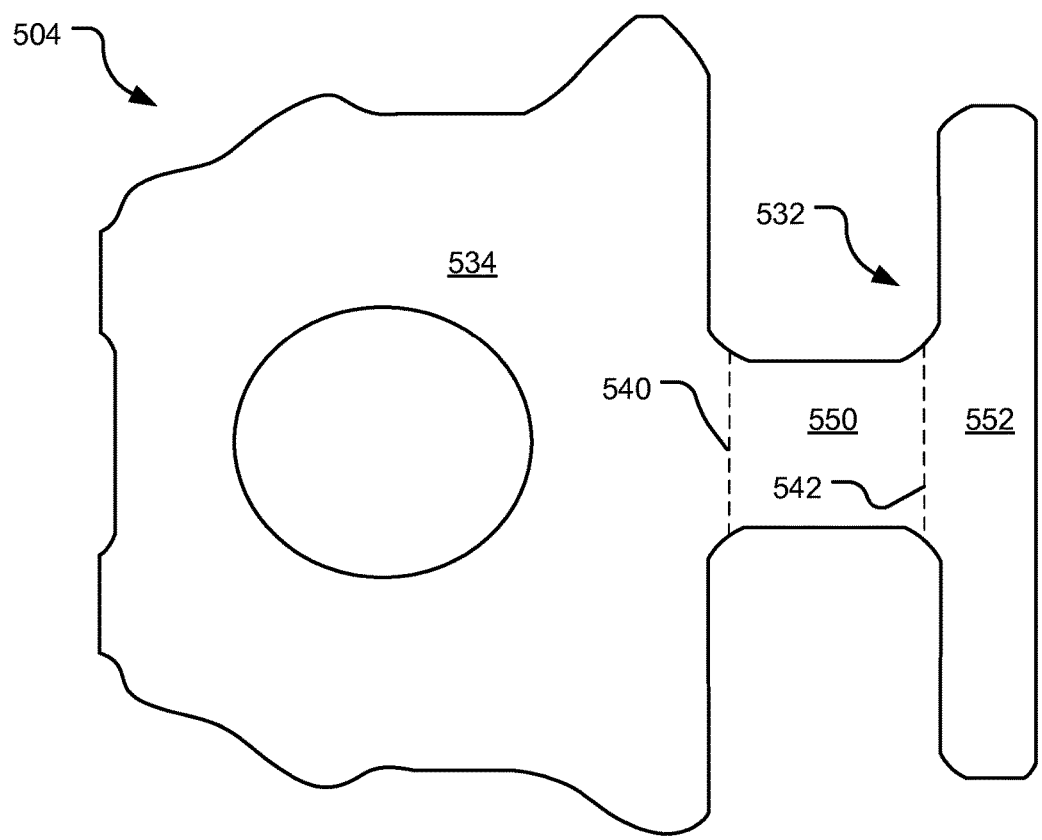
FIG. 5A is a plan view of an example multi-planar baseplate.

FIG. 5A is a plan view of an example multi-planar baseplate 504. Similar to the tilted baseplate 440 of FIGS. 4A and 4B, the multi-planar baseplate 504 has a main section 534 and a T-shaped section 532. The main section 534 is configured to attach to an actuator arm and is oriented generally parallel to a disc surface. The T-shaped section 532 is configured to attach to a load beam and includes a center portion 550 and a top portion 552. The T-shaped section 532 has a first deflection line 540 and a second deflection line 542 that collectively move the center portion 550 of the T-shaped section 532 to a plane closer to the disc surface.

Figure 5B:
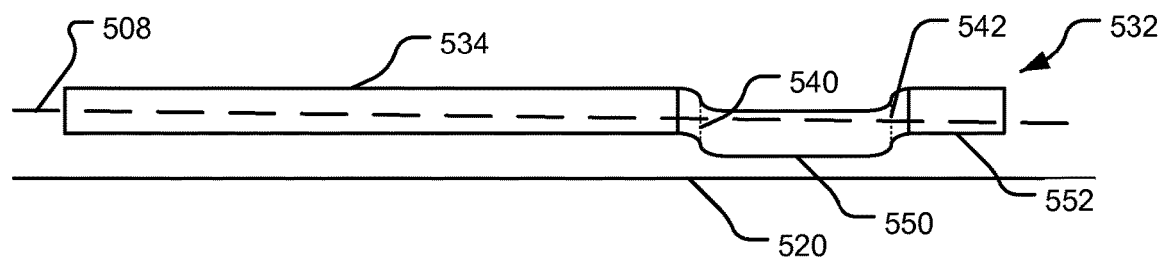
FIG. 5B is an elevation view of the example multi-planar baseplate of FIG. 5A.

FIG. 5B is an elevation view of the example multi-planar baseplate 504 of FIG. 5A. Moving from left to right on FIG. 5B, the main section 534 of the multi-planar baseplate 504 is oriented parallel to the disc surface 520 and at a first distance from the disc surface 520. The center portion 550 of the T-shaped section 532 is shifted at first deflection line 540 to a plane also parallel to the disc surface 520, but closer to the disc surface 520. The top portion 552 of the T-shaped section 532 is shifted at the second deflection line 542 to a plane also parallel to the disc surface 520. In some implementations, the top portion 552 at the same distance from the disc surface 520 as the main section 534. In other implementations, the top portion 552 of the T-shaped section 532 is shifted at the second deflection line 542 to a plane also parallel to the disc surface 520, further away from (or closer to) the disc surface 520 than the center portion 550, but not at the same distance from the disc surface 520 as the main section 534. A torsion axis 508 is coincident with a center of mass of the multi-planar baseplate 504. Therefore, by deflecting the center portion 550 of the T-shaped section 532 closer to the disc surface 520, the torsion axis 508 is deflected downward toward the disc surface 520.

Figure 6A:
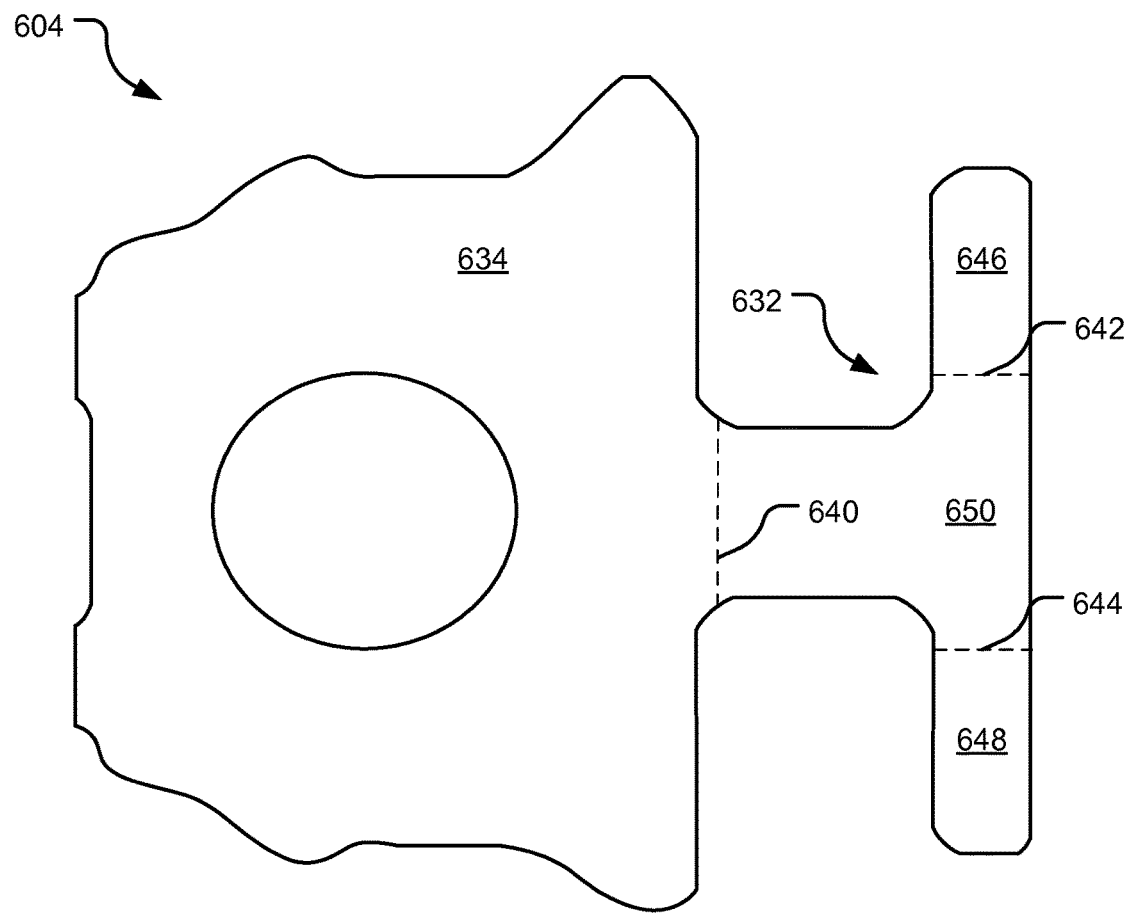
FIG. 6A is a plan view of an example multi-planar baseplate.

FIG. 6A is a plan view of an example multi-planar baseplate 604. Similar to the tilted baseplate 440 of FIGS. 4A and 4B, the multi-planar baseplate 604 has a main section 634 and a T-shaped section 632. The main section 634 is configured to attach to an actuator arm and is oriented generally parallel to a disc surface. The T-shaped section 632 is configured to attach to a load beam and includes a center portion 550, a first top portion 646, and a second top portion 648. The T-shaped section 632 has a first deflection line 640, a second deflection line 642, and a third deflection line 644 that collectively move the center portion 650 of the T-shaped section 632 to a plane closer to the disc surface.

Figure 6B:
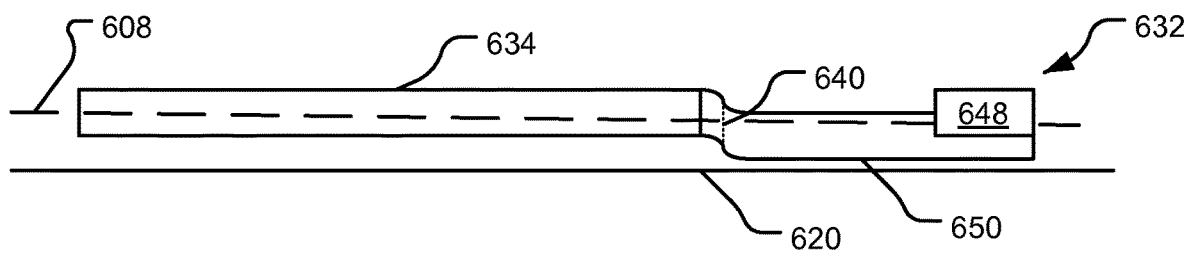
FIG. 6B is an elevation view of the example multi-planar baseplate of FIG. 6A.

FIG. 6B is an elevation view of the example multi-planar baseplate 604 of FIG. 6A. Moving from left to right on FIG. 6B, the main section 634 of the multi-planar baseplate 604 is oriented parallel to the disc surface 620 and at a first distance from the disc surface 620. The center portion 650 of the T-shaped section 632 is shifted at the first deflection line 640 to a plane also parallel to the disc surface 620, but closer to the disc surface 620. The first top portion 646 and the second top portion 648 of the T-shaped section 632 (see FIG. 6A) are shifted at the second deflection line 642 and third deflection line 644, respectively to a plane also parallel to the disc surface 620, but at the same or a similar distance from the disc surface 620 as the main section 634.

In other implementations, the first top portion 646 and the second top portion 648 of the T-shaped section 632 (see FIG. 6A) are shifted at the second deflection line 642 and third deflection line 644 respectively to a plane also parallel to the disc surface 620, further away from (or closer to) the disc surface 620 than the center portion 650, but not at the same distance from the disc surface 620 as the main section 634. A torsion axis 608 is coincident with a center of mass of the multi-planar baseplate 604. By deflecting the center portion of the T-shaped section 632 closer to the disc surface 620, the torsion axis 608 is deflected downward toward the disc surface 620. In this implementation, the multi-planar baseplate 604 has three planes (compared to the two planes in the implementation shown in FIG. 6B).

Tilting and/or deflecting all or a section of a baseplate toward a disc surface reduces suspension-to-disc clearance. When compared to the multi-planar baseplate 504 of FIG. 5, the deflected center portion 650 of FIG. 6 is larger than the deflected center portion 550 of FIG. 5. As a result, the amount of deflection of center portion 650 may be less than center portion 550 to achieve the same deflection of torsion axis 608. Similarly, the tilted baseplate 404 of FIGS. 4A and 4B reduces suspension-to-disc clearance less than the multi-planar baseplates 504, 604 of FIGS. 5A-6B because the tilted portion of the tilted baseplate 404 is larger than the deflected portions of the multi-planar baseplates 504, 604. Since the multi-planar baseplate 604 is mounted in close proximity to the disc surface 620, the multi-planar baseplate 604 may be preferable to the multi-planar baseplate of FIG. 5 due to clearance issues between the multi-planar baseplate 604 and the disc surface 620.

In an example implementation, the tilted baseplate 404 of FIGS. 4A and 4B reduces suspension-to-disc clearance by 0.075 mm when compared to a level baseplate. The multi-planar baseplate 504 of FIGS. 5A and 5B reduces suspension-to-disc clearance by 1.5 mm when compared to the level baseplate. The multi-planar baseplate 604 of FIGS. 6A and 6B reduces suspension-to-disc clearance by 1.0 mm when compared to the level baseplate.

One advantage of the multi-planar baseplates 504, 604 over the tilted baseplate 404 is that piezoelectric elements for fine position control of a head remain parallel to a suspension and a disc surface. This simplifies assembly of the piezoelectric elements to the suspension since the piezoelectric elements are not assembled at an angle relative to the rest of the suspension.

The baseplate form factors depicted in FIGS. 3-6B are examples only; other form factors are contemplated herein that optimize a baseplate torsion axis to pass near or through a head. Further, the tilted baseplates of FIGS. 1, 3, 4A, and 4B as well as the multi-planar baseplates of FIGS. 5A-6B may be created using a variety of forming techniques (e.g., press braking, stamping, bending, casting, extruding, and/or molding). Further, the tilted baseplates and multi-planar baseplates may be constructed of a variety of metal alloys including, for example, steel, aluminum, copper, and titanium. Still further, the tilted baseplates and multi-planar baseplates may include a variety of rigid plastics, for example, polyethylene, polypropylene, and polystyrene.

Figure 7:
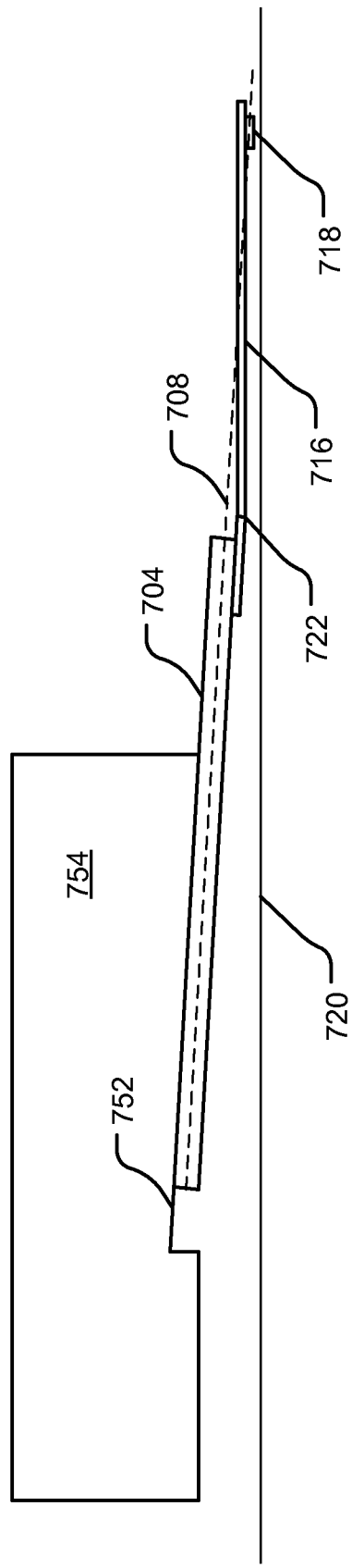
FIG. 7 is an elevation view of an example tilted baseplate mounted on a tilted surface of an actuator arm with a corresponding torsion axis.

FIG. 7 is an elevation view of an example tilted baseplate 704 mounted on a tilted surface 752 of an actuator arm 754 with a corresponding torsion axis 708. In some implementations, microactuator suspension designs according to the presently disclosed technology mount the baseplate 704 to the tilted surface 752 on the actuator arm 754 to achieve a desired tilt angle that is optimized to pass the torsion axis 708 near or through a respective head 718. The actuator arm 754, tilted baseplate 704, a load beam 716, and the head 718 are all a part of suspension for a disc drive. The head 718 "flies" a distance above a disc surface 720 and follows a desired track on the disc as the disc spins.

The tilted baseplate 704 may have a distribution of mass that is closer to the disc surface 720 than the level baseplate 102 of FIG. 1A. This is referred to herein as shifting the mass of the baseplate 704 toward the disc surface 702. As a result, the torsion axis 708 corresponding to the tilted baseplate 704 is similarly closer to the disc surface 720. Further, tilting the baseplate 704 may also tilt the torsion axis 708 toward the disc surface 702. The exact angle and position of the baseplate torsion axis 708 depends on the weight distribution of the tilted baseplate 704 and angle of the tilted surface 752. The weight distribution of the tilted baseplate 704 is optimized such that the torsion axis 708 passes near or through the head 718 rather than above the head 118 as in FIG. 1A.

While torsion about the torsion axis 708 may still cause rotation of the baseplate 704 and the load beam 716 about the baseplate torsion axis 708, lateral displacement of the head 718 is significantly reduced or eliminated. Additionally, an end of the tilted baseplate 704 that attaches to the load beam 716 is angled toward the disc surface 720 and/or oriented closer to the disc surface 720 than the level baseplate 102 of FIG. 1A. As a result, the load beam 716 may have one or more deflections 722 to restore the load beam 716 to a desired orientation and height above the disc surface 720.

Figure 8:
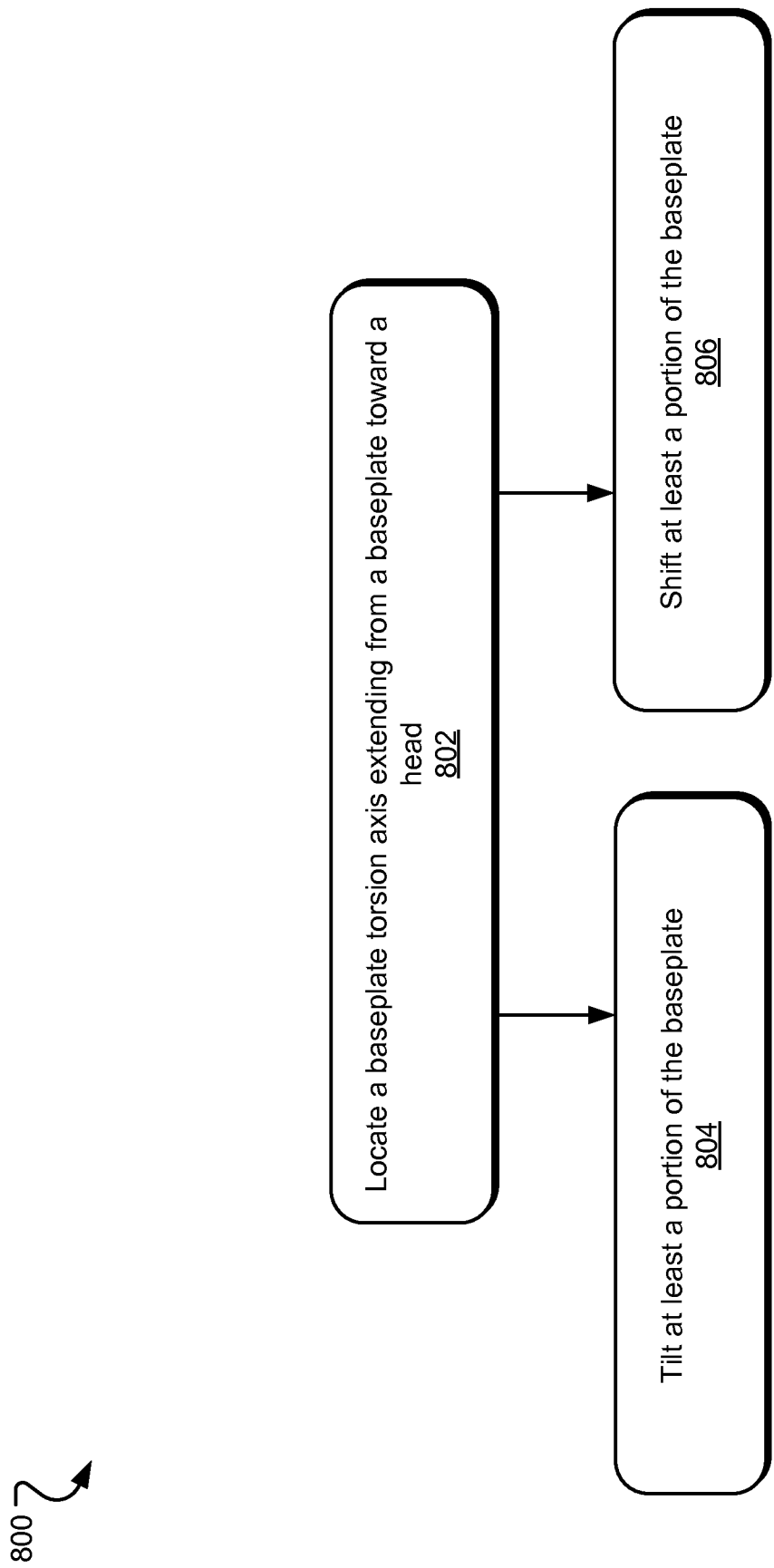
FIG. 8 illustrates example operations for reducing or eliminating off-track motion of a head caused by a baseplate torsion mode.

FIG. 8 illustrates example operations for reducing or eliminating off-track motion of a head caused by a baseplate torsion mode. In a locating operation 802, a baseplate torsion axis is located extending from a baseplate toward a head on a head suspension. The baseplate torsion axis corresponds to at least one baseplate torsion mode that causes torsion of the baseplate, a load beam, and the head along the baseplate torsion axis.

In a tilting operation 804, the baseplate is tilted toward (or away from) a disc to move the torsion axis to pass near or through the head. Tilting the baseplate moves a mass distribution of the baseplate toward the disc. Since the location of the torsion axis is related to the weight distribution of the baseplate, the torsion axis moves toward the disc as well. The whole baseplate may be tilted toward the disc by mounting the baseplate on a tilted surface on an actuator arm. Alternatively, the actuator arm itself may be tilted and thus the baseplate mounted to the actuator arm is similarly tilted. In an implementation where the baseplate has one or more bends, only one or more sections of the baseplate are tilted and the remainder of the baseplate is level with the disc.

In a moving operation 806, at least a portion of the baseplate is moved toward (or away from) the disc to shift its mass and move the torsion axis to pass near or through the head. Similar to tilting the baseplate, shifting the baseplate toward the disc moves a mass distribution of the baseplate toward the disc. Since the location of the torsion axis is related to the weight distribution of the baseplate, the torsion axis moves toward the disc as well. In some implementations, the torsion axis runs through a center of mass of the baseplate. In an example shifting operation, a center portion of the baseplate may be shifted to a plane closer to the disc than the remainder of the baseplate. Shifting the mass of the baseplate (a mass-shifting operation) includes at least tilting at least a portion of the baseplate or the surface the baseplate attaches to (see e.g., operation 804) or moving at least a portion of the baseplate (see e.g., operation 806).

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
   positioning a head to access data from an adjacent disc surface, the head supported by a load beam attached to a baseplate, the baseplate including:
   a planar main section and a mass-shifted section; and
   at least one microactuator motor element positioned on the mass-shifted_section of the baseplate to provide fine position control of the head;
   wherein the mass-shifted section includes a top portion and a center portion, the top portion being wider and further away from the adjacent disc surface than the center portion and coupled to the load beam, and wherein the mass-shifted section causing a torsion axis of the planar main section and the mass-shifted section to angle toward the head when the head is flying above the adjacent disc surface with the center portion of the mass-shifted section being closer to the adjacent disc surface than the planar main section.

2. The method of claim 1 wherein the planar main section and the mass-shifted section are separated by one or more deflection lines.

3. The method of claim 1, wherein the mass-shifted section further comprises a first deflection line between the top portion and the center portion.

4. The method of claim 3, wherein the top portion of the mass-shifted section and the planar main section are coplanar.

5. The method of claim 3, wherein the center portion and the top portion make a T-shape.

6. The method of claim 3, wherein the top portion comprises a first top portion adjacent a second deflection line and a second top portion adjacent a third deflection line, wherein the center portion separates the first top portion and the second top portion.

7. The method of claim 1, further comprising:
   deforming the baseplate by actuating the at least one microactuator motor element mounted to the baseplate.

8. The method of claim 1 wherein the planar main section defines a first plane generally parallel to the adjacent disc surface and the mass-shifted section defines a second plane closer to the adjacent disc surface than the first plane.

9. The method of claim 1 the mass-shifted section causes a torsion axis of the planar main section and the mass-shifted section to pass through the head when the head is flying above the adjacent disc surface.

10. Apparatus comprising:
    a load beam supported a head and attached to a baseplate, the baseplate including:
    a planar main section and a mass-shifted section; and
    at least one microactuator motor element positioned on a mass-shifted portion of the baseplate to provide fine position control of the head, wherein the mass-shifted section includes a top portion and a center portion, the top portion being wider and further away from the adjacent disc surface than the center portion and coupled to the load beam, and wherein the mass-shifted section causing a torsion axis of the planar main section and the mass-shifted section to angle toward the head when the head is flying above the adjacent disc surface with the center portion of the mass-shifted section being closer to the adjacent disc surface than the planar main section.

11. The apparatus of claim 10, wherein the planar main section and the mass-shifted section are separated by one or more deflection lines.

12. The apparatus of claim 10, wherein the mass-shifted section further includes a first deflection line between the top portion and the center portion.

13. The apparatus of claim 12, wherein the top portion of the mass-shifted section and the planar main section are coplanar.

14. The apparatus of claim 12, wherein the center portion further couples to the planar main section.

15. The apparatus of claim 12, wherein the top portion comprises a first top portion adjacent a second deflection line and a second top portion adjacent a third deflection line, wherein the center portion separates the first top portion and the second top portion.

16. The apparatus of claim 10, wherein the baseplate includes at least one piezoelectric element to provide fine position control of the head.

17. The apparatus of claim 10, wherein the planar main section defines a plane generally parallel to the adjacent disc surface and the mass-shifted section defines a second plane closer to the adjacent disc surface than the first plane.

18. The apparatus of claim 10 wherein the mass-shifted section causes a torsion axis of the planar main section and the mass-shifted section to pass through the head when the head is flying above the adjacent disc surface.

\* \* \* \* \*